(12) United States Patent
Lewis

(10) Patent No.: US 12,722,208 B2
(45) Date of Patent: Sep. 1, 2026

(54) CONNECTOR SYSTEM FOR OPERATING A TRAILER JACK AND A HOPPER DOOR ACTUATOR WITH A DRILL

(71) Applicant: Steve Lewis, Butler, MO (US)

(72) Inventor: Steve Lewis, Butler, MO (US)

( * ) Notice: Subject to any disclaimer, the term of this patent is extended or adjusted under 35 U.S.C. 154(b) by 666 days.

(21) Appl. No.: 18/117,901

(22) Filed: Mar. 6, 2023

(65) Prior Publication Data

US 2024/0300035 A1 Sep. 12, 2024

(51) Int. Cl.
*B23B 31/10* (2006.01)
*B23B 51/12* (2006.01)
*B60S 9/04* (2006.01)

(52) U.S. Cl.
CPC ............ *B23B 31/102* (2013.01); *B23B 51/12* (2013.01); *B23B 2231/04* (2013.01); *B60S 9/04* (2013.01); *Y10T 279/3418* (2015.01)

(58) Field of Classification Search
CPC ... B23B 31/102; B23B 51/12; B23B 2231/04; B60S 9/04; Y10T 279/3406; Y10T 279/3418
See application file for complete search history.

(56) References Cited

U.S. PATENT DOCUMENTS 4,613,149 A 9/1986 Williams, Jr.
5,401,046 A 3/1995 Schwartz
5,897,121 A * 4/1999 Case ........................ B25B 13/48 254/133 R
6,010,154 A * 1/2000 Payne ........................ B60S 9/08 81/176.15
6,142,501 A 11/2000 Fogo
6,705,597 B1 * 3/2004 Reilly ................... B60P 7/0846 254/223
8,944,455 B2 2/2015 Lambros
10,464,193 B2 * 11/2019 Chen ................... B25B 23/0078
11,660,680 B2 * 5/2023 Lee ......................... B23B 31/06 279/143
11,912,249 B2 * 2/2024 Bedel ........................ B60S 9/08
2004/0104381 A1 6/2004 Sharp
2008/0164683 A1 * 7/2008 VanDenberg ............. B60S 9/08 280/766.1
2025/0249867 A1 * 8/2025 Davis ........................ B60S 9/06

FOREIGN PATENT DOCUMENTS

WO WO2018039447 3/2018

* cited by examiner

*Primary Examiner* — Eric A. Gates

(57) ABSTRACT

A connector system for coupling a drill to an input shaft for a trailer-mounted mechanism includes a drill attachment member is elongated from a drill end to an output end of the drill attachment member. The drill attachment member is configured to be clamped by a chuck of a drill adjacent to the drill end. The drill attachment member has a notch extending into the output end and extending transversely through the drill attachment member. An input shaft is engageable by the drill attachment member such that the input shaft is rotatable by the drill attachment member around a central axis of the input shaft.

9 Claims, 11 Drawing Sheets

CONNECTOR SYSTEM FOR OPERATING A TRAILER JACK AND A HOPPER DOOR ACTUATOR WITH A DRILL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer-mounted mechanisms and more particularly pertains to a new connector system for coupling a drill to an input shaft for a trailer-mounted mechanism.

(2) Description of Related Art Including Information Disclosed Under 37 CFR 1.97 and 1.98

The prior art relates to trailer jacks and includes electric motors and hydraulic actuators which lower legs of a trailer jack to land a trailer on the ground. However, the prior art does not disclose a connector system for connecting a drill to an input shaft of a trailer jack to operate the jack with the drill. The prior art further does not disclose such a system which is configured for operating an input shaft of a trailer hopper door.

BRIEF SUMMARY OF THE INVENTION

An embodiment of the disclosure meets the needs presented above by generally comprising a drill attachment member is elongated from a drill end to an output end of the drill attachment member. The drill attachment member is configured to be clamped by a chuck of a drill adjacent to the drill end. The drill attachment member has a notch extending into the output end and extending transversely through the drill attachment member. An input shaft is engageable by the drill attachment member such that the input shaft is rotatable by the drill attachment member around a central axis of the input shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
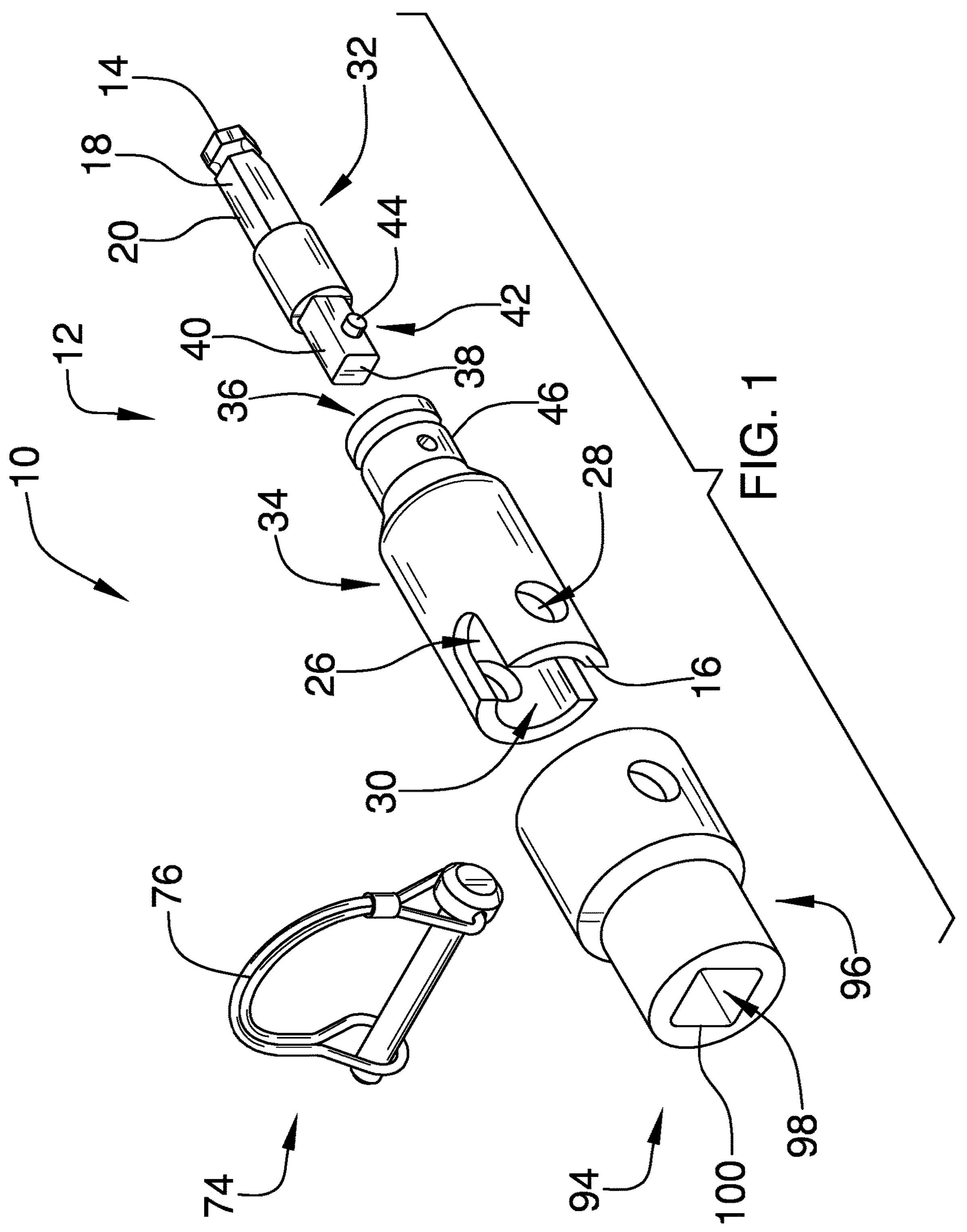
FIG. 1 is an exploded perspective view of a connector system according to a third embodiment of the disclosure.
Figure 2:
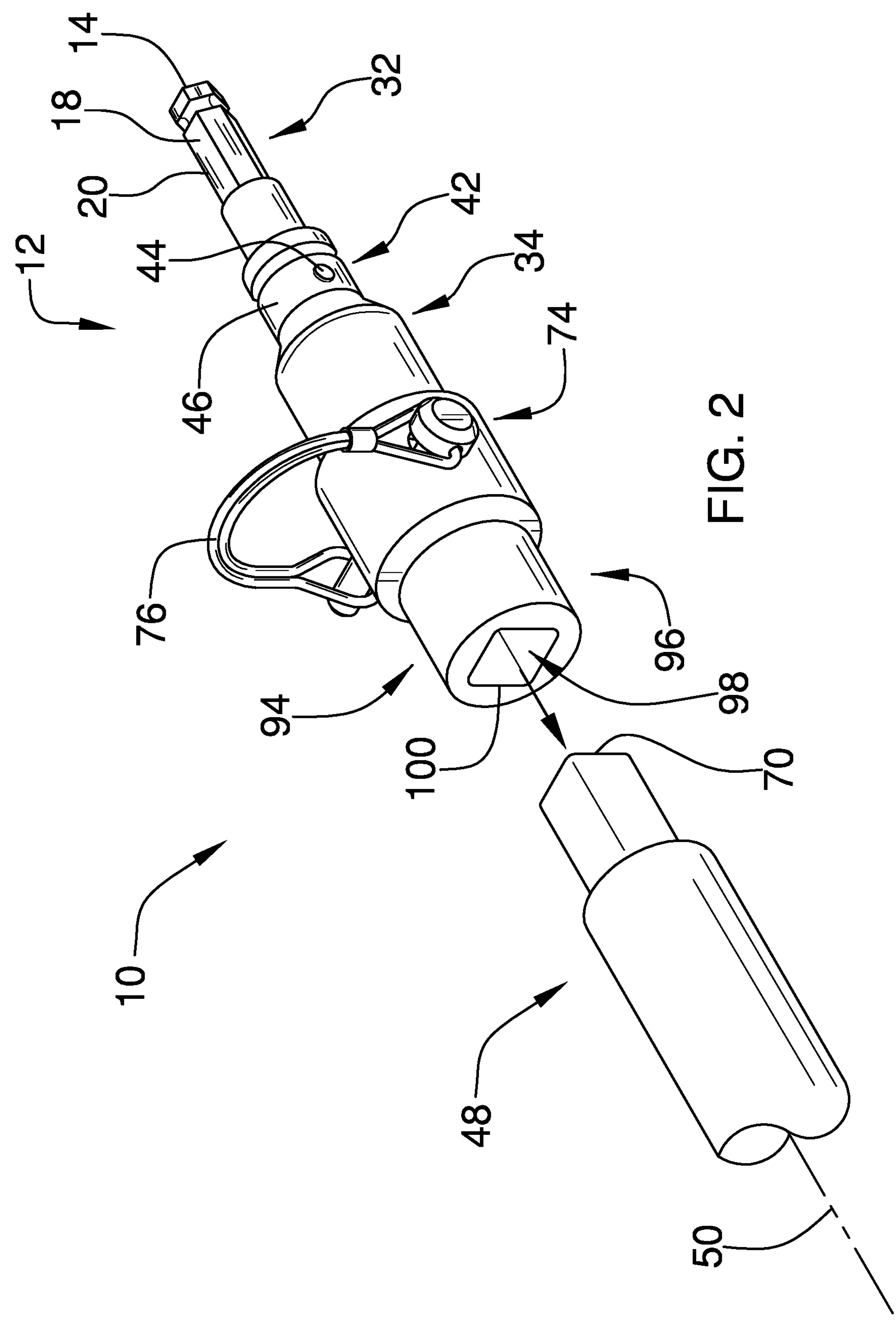
FIG. 2 is an exploded perspective view of a third embodiment of the disclosure.
Figure 3:
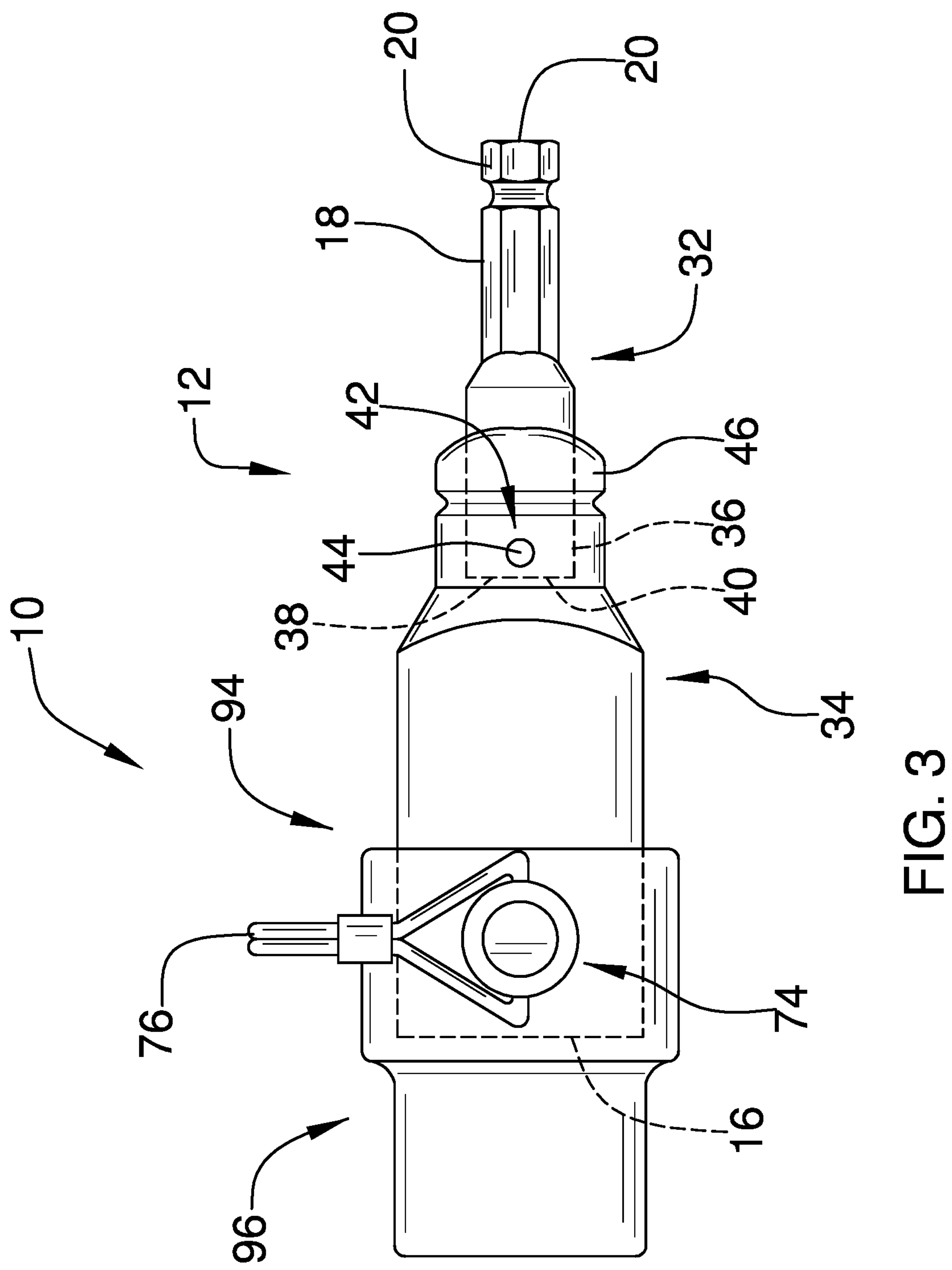
FIG. 3 is a side view of a third embodiment of the disclosure.
Figures 4, 5:
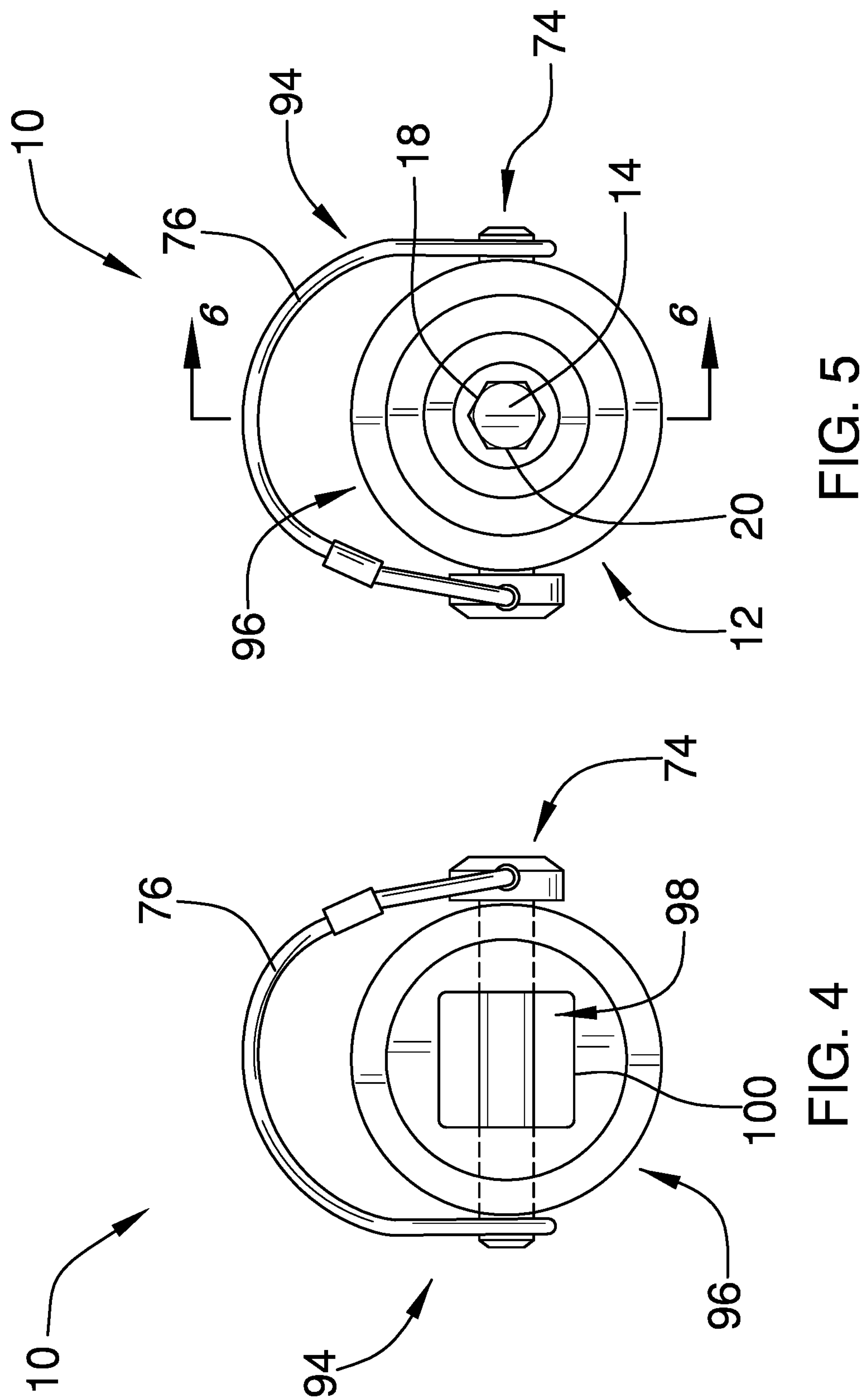
FIG. 4 is a rear view of a third embodiment of the disclosure.
FIG. 5 is a front view of a third embodiment of the disclosure.
Figure 6:
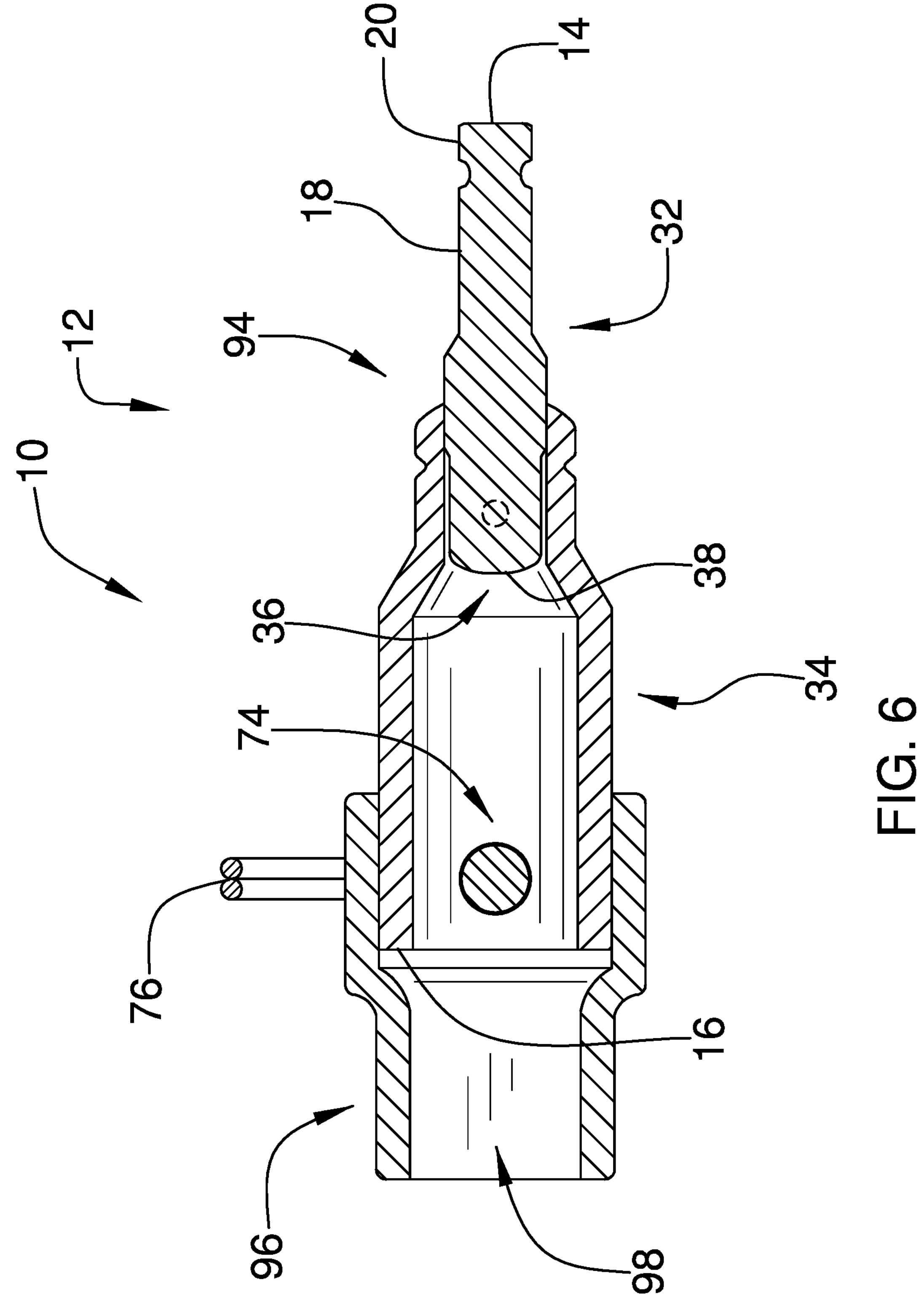
FIG. 6 is a cross-sectional view of a third embodiment of the disclosure taken from Arrows 6-6 in FIG. 5.
Figure 7:
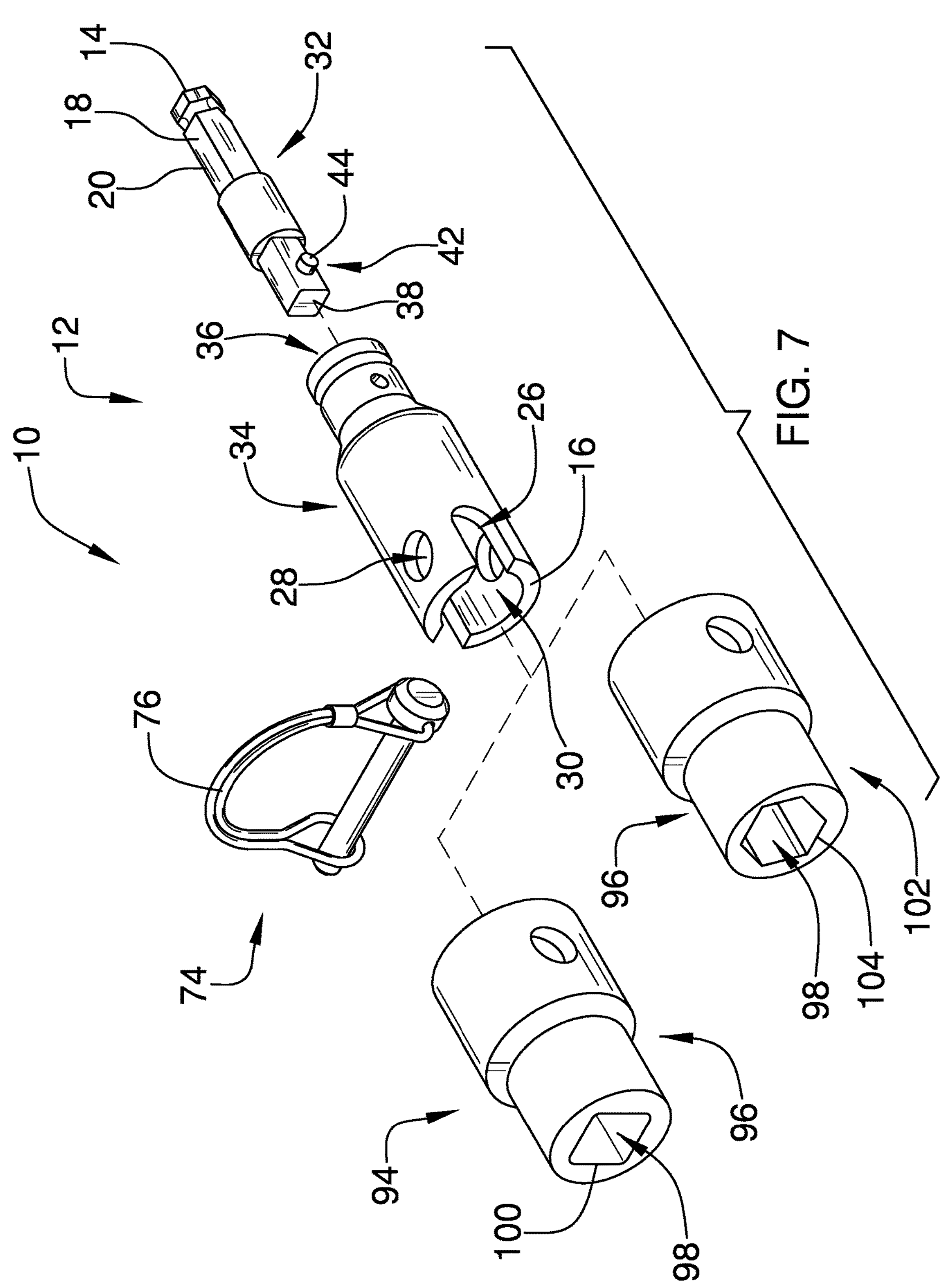
FIG. 7 is an exploded perspective view of a third embodiment and a fourth embodiment of the disclosure.
Figure 8:
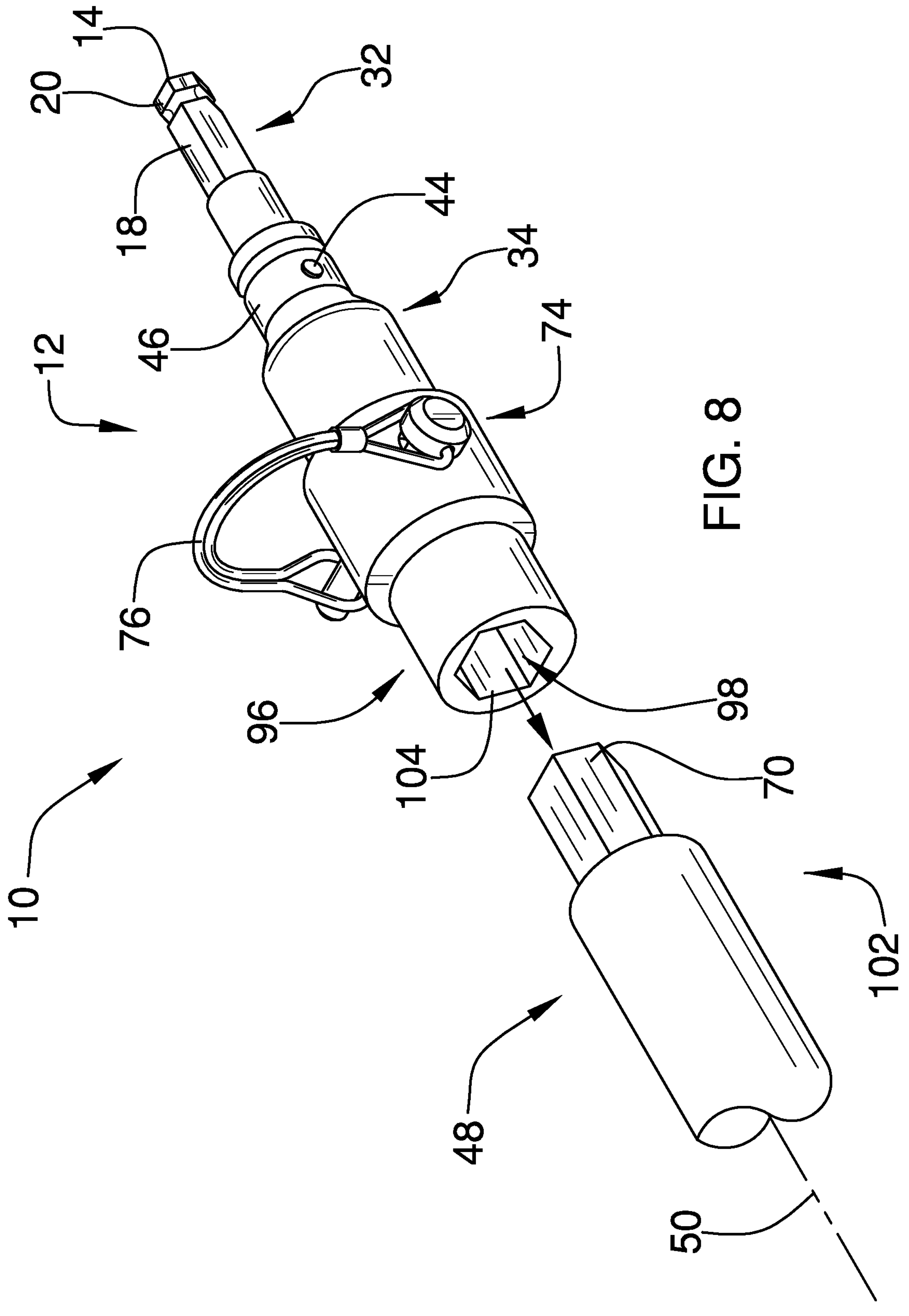
FIG. 8 is an exploded perspective view of a fourth embodiment of the disclosure.
Figure 9:
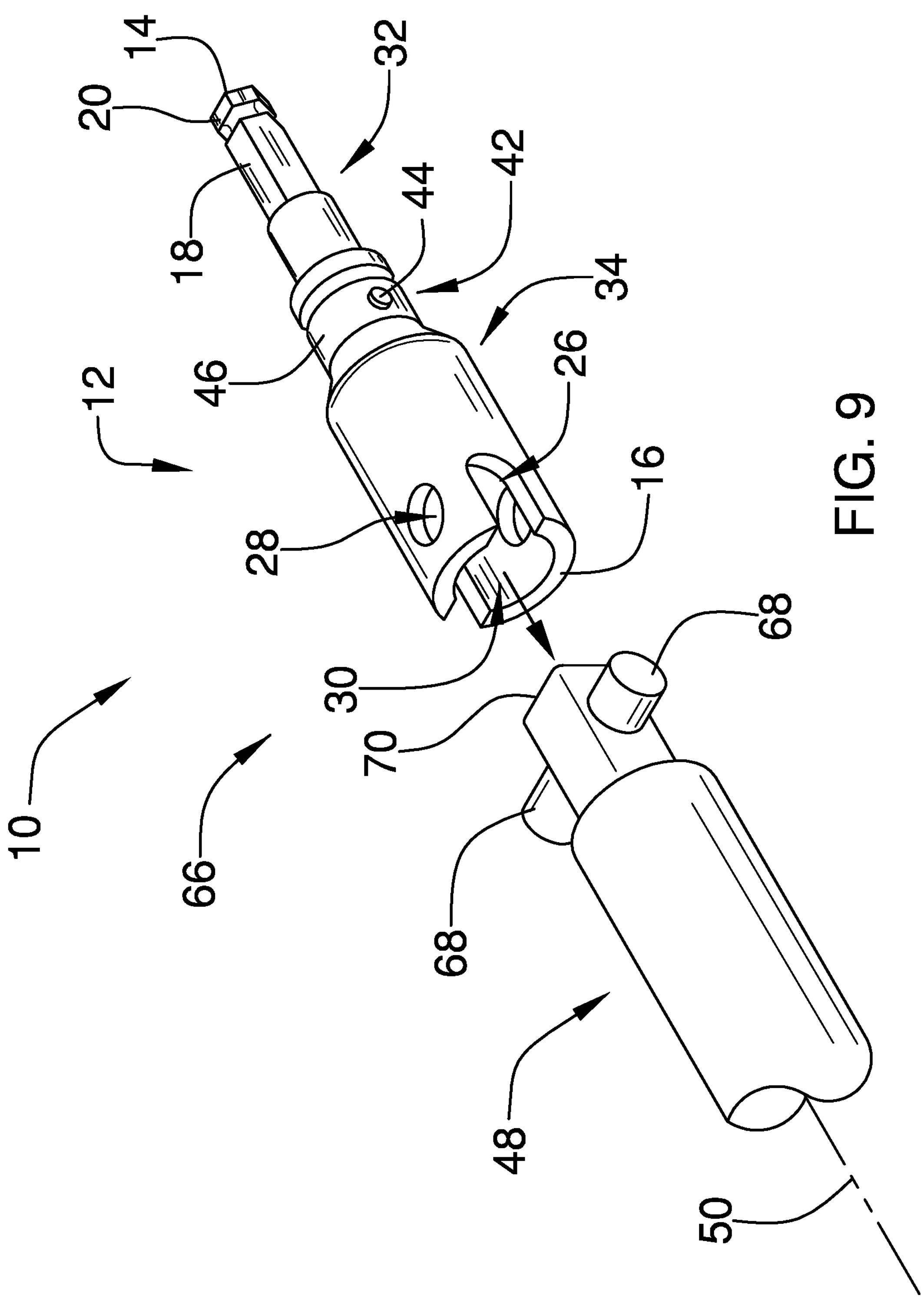
FIG. 9 is an exploded perspective view of a first embodiment of the disclosure.
Figures 10, 11:
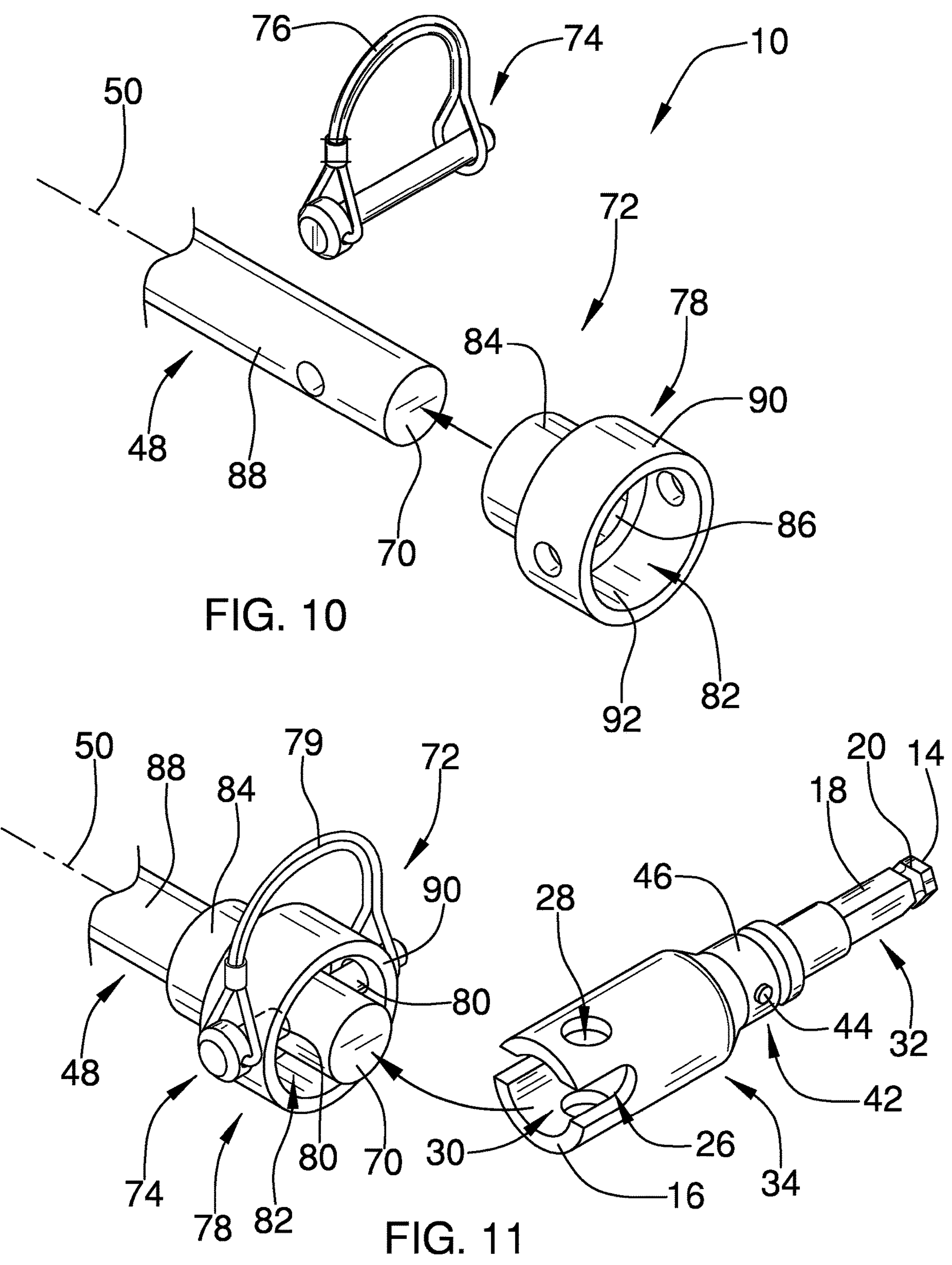
FIG. 10 is an exploded perspective view of a second embodiment of the disclosure.
FIG. 11 is an exploded perspective view of a second embodiment of the disclosure.
Figure 12:
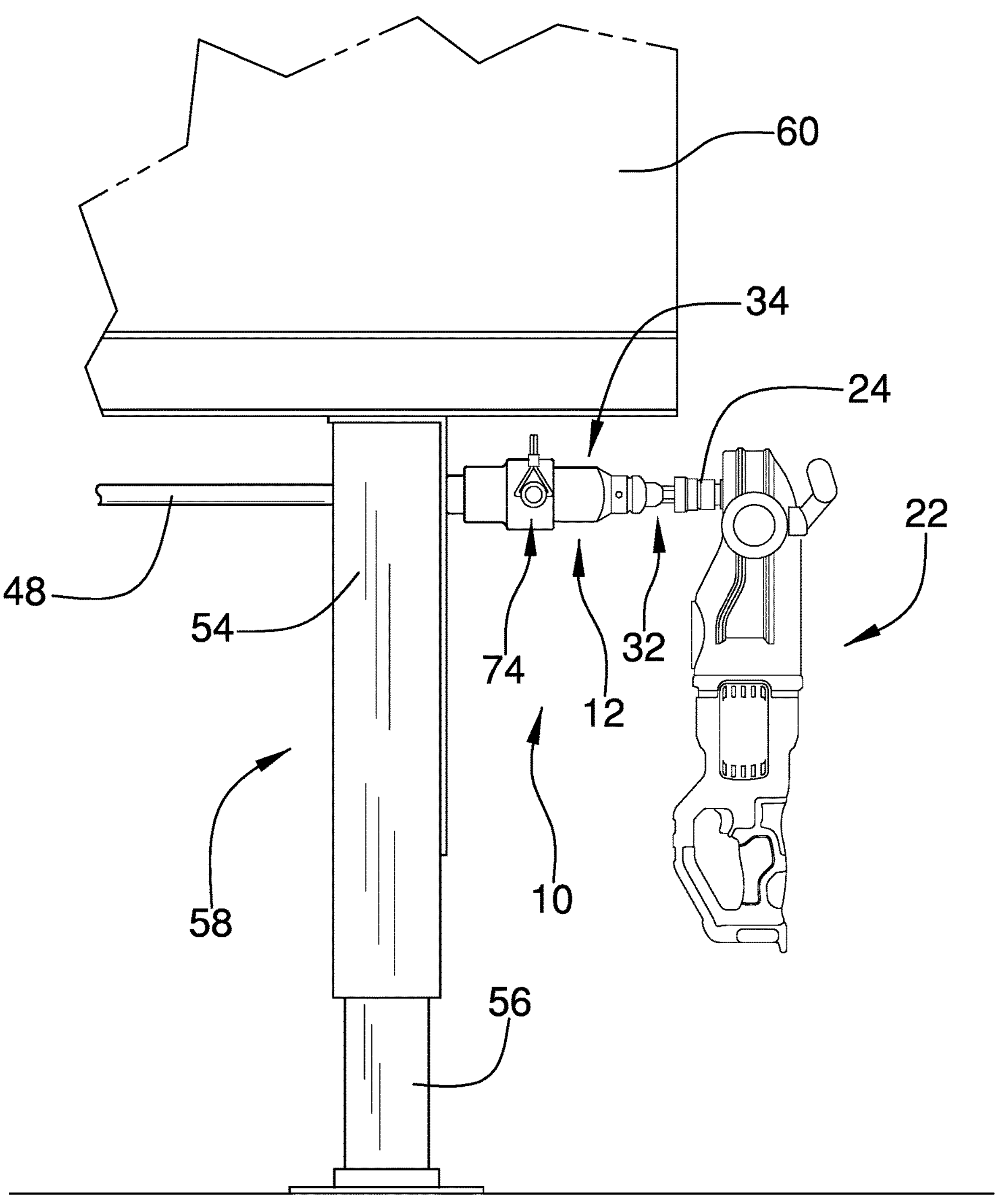
FIG. 12 is an in-use view of an embodiment of the disclosure.
Figure 13:
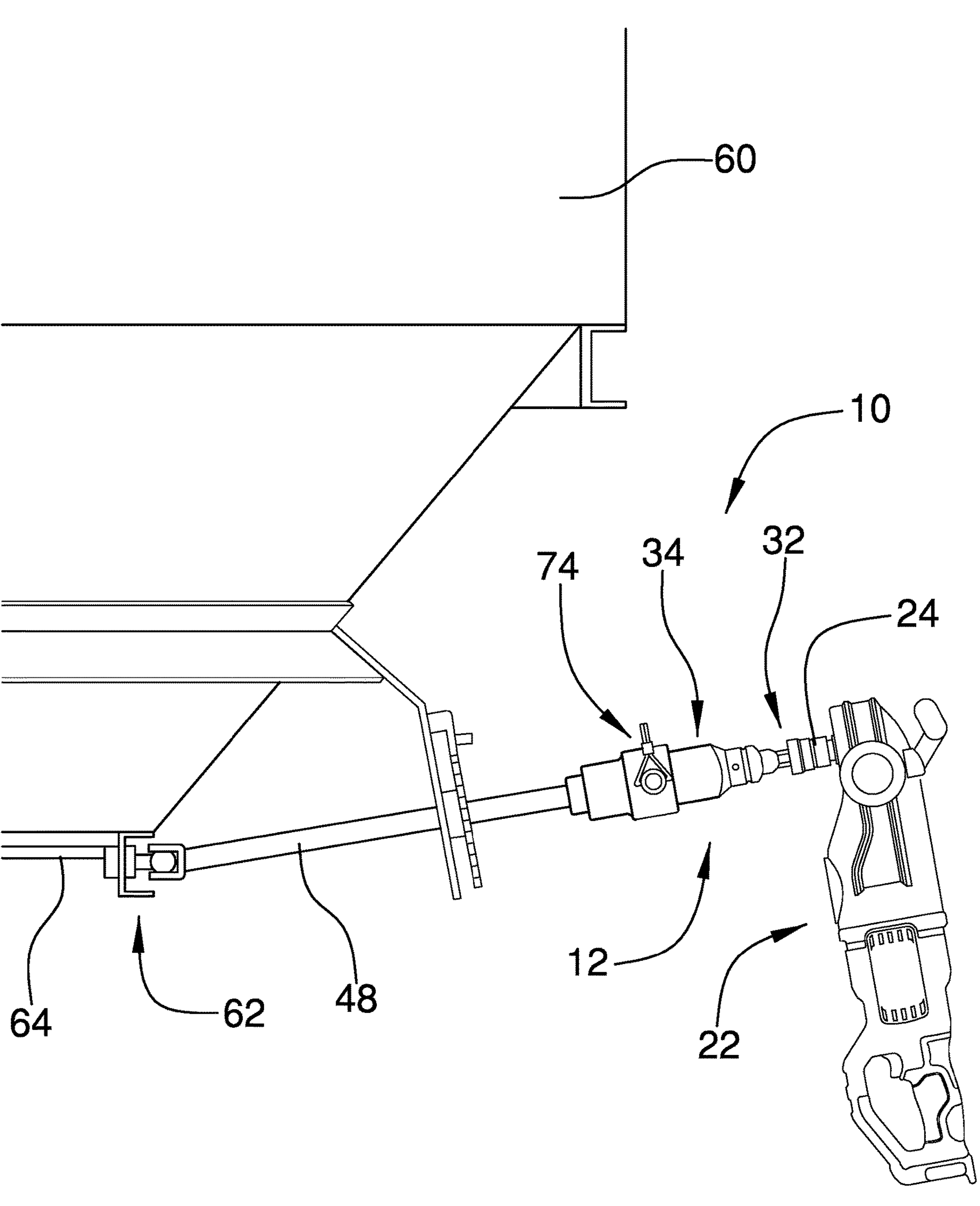
FIG. 13 is an in-use view of an embodiment of the disclosure.

With reference now to the drawings, and in particular to FIGS. 1 through 13 thereof, a new connector system embodying the principles and concepts of an embodiment of the disclosure and generally designated by the reference numeral 10 will be described.

As best illustrated in FIGS. 1 through 13, the connector system 10 generally comprises a drill attachment member 12 which is elongated from a drill end 14 to an output end 16 of the drill attachment member 12. An outer surface 18 of the drill attachment member 12 adjacent to the drill end 14 has a hexagonal shape 20 so that the drill attachment member 12 may be clamped by a chuck 24 of a drill 22 adjacent to the drill end 14. The outer surface 18 adjacent to the drill end 14 also may have a circular shape, a triangular shape, or the like such that the chuck 24 of the drill 22 can grip and turn the drill attachment member 12 effectively for the use described below. The drill attachment member 12 has a notch 26 extending into the output end 16 and extending transversely through the drill attachment member 12. A hole 28 is radially spaced from the notch 26 and extends transversely through the drill attachment member 12 adjacent to the output end 16. The drill attachment member 12 has a cavity 30 extending into the output end 16 and is in communication with the notch 26 and the hole 28.

The drill attachment member 12 comprises a drill portion 32 and an output portion 34 which are releasably couplable to each other. The drill portion 32 includes the drill end 14 of the drill attachment member 12, and the output portion 34 includes the output end 16 of the drill attachment member 12. The output portion 34 has a recess 36 which extends into the output portion 34 and is complementary in shape to an opposing end 38 of the drill portion 32 with respect to the drill end 14. The recess 36 has a square shape 40 but may have an alternative shape such that torque is transferable between the drill portion 32 and the output portion 34. The drill attachment member 12 also includes a securement member 42 for securing the drill portion 32 to the output portion 34. The securement member 42 comprises a biased pin 44 coupled to the drill portion 32 and is biased to extend through a wall 46 of the output portion 34 when the drill portion 32 is received into the recess 36.

An input shaft 48 is engageable by the drill attachment member 12 such that the input shaft 48 is rotatable by the drill attachment member 12 around a central axis 50 of the input shaft 48. The input shaft 48 is configured to be coupled to a trailer-mounted mechanism 52. The trailer-mounted mechanism 52 may be a jack 54 for raising and lowering a leg 56 of a landing gear mechanism 58 of a trailer 60. The trailer-mounted mechanism 52 also may be an actuator 62 for opening and closing a hopper door 64 of a trailer 60.

In a first embodiment 66 of the connector system 10, a pair of shaft pins 68 is coupled to the input shaft 48 and is receivable into the notch 26 of the drill attachment member 12. An end 70 of the input shaft 48 is received into the cavity 30 of the drill attachment member 12 when the pair of shaft pins 68 is received into the notch 26.

In a second embodiment 72, a locking pin 74 is insertable laterally through the input shaft 48. The locking pin 74 is receivable into a selected one of the notch 26 and the hole 28 of the drill attachment member 12 so the drill attachment member 12 can rotatably engage the input shaft 48. The locking pin 74 includes a retainer 76 for retaining the locking pin 74 on the input shaft 48.

A pin spacer 78 is couplable to the input shaft 48 in the second embodiment 72 and the locking pin 74 and is shaped to retain a pair of segments 80 of the locking pin 74 opposite each other across the input shaft 48 when the pin spacer 78 is coupled to the input shaft 48 and the locking pin 74. The pin spacer 78 has a channel 82 extending through the pin spacer 78 such that the input shaft 48 is receivable into the channel 82. The pin spacer 78 includes a first portion 84 which has an interior surface 86 that is complementary in size and shape to a perimeter surface 88 of the input shaft 48. The pin spacer 78 also includes a second portion 90 which has an inner surface 92 spaced from the perimeter surface 88 of the input shaft 48. The output end 16 of the drill attachment member 12 is insertable into the channel 82 between the input shaft 48 and the second portion 90 of the pin spacer 78. The locking pin 74 is insertable simultaneously through each of the pin spacer 78, the input shaft 48, and one of the notch 26 and the hole 28 of the drill attachment member 12. The retainer 76 engages an outer surface of the pin spacer 78 when the locking pin 74 is inserted through the pin spacer 78 to retain the locking pin 74 to the pin spacer 78 and maintain the pair of segments 80 of the locking pin 74 opposite each other across the input shaft 48.

In a third embodiment 94, an adapter 96 is couplable with the drill attachment member 12 and engageable with the input shaft 48. The adapter 96 has a socket 98 which extends into the adapter 96 opposite the drill attachment member 12 when the adapter 96 is coupled to the drill attachment member 12. The socket 98 is complementary in size and shape to a perimeter surface 88 of the input shaft 48. The socket 98 in the third embodiment 94 has a square shape 100. The connector system 10 includes a locking pin 74 in the third embodiment 94 that is insertable through the adapter 96 and the hole 28 of the drill attachment member 12 to couple the adapter 96 to the drill attachment member 12. The locking pin 74 includes a retainer 76 for retaining the locking pin 74 to the adapter 96 and the drill attachment member 12. The locking pin 74 in the third embodiment 94 may be the same as the locking pin 74 in the second embodiment 72. In a fourth embodiment 102, the connector system 10 includes an adapter 96 and a locking pin 74 as described above for the third embodiment 94, except the socket 98 of the adapter 96 in the fourth embodiment 102 has a hexagonal shape 104.

In use, the drill attachment member 12 is attached to the drill 22 and is placed in engagement with the input shaft 48 either directly or through other components depending on the embodiment. The drill 22 is then operated to urge the drill attachment member 12 to rotate, causing the input shaft 48 to rotate about the central axis 50. In some cases, the input shaft 48 may be configured to be moved axially to select between a pair of gear ratios of a gearbox. In these cases, the connector system 10 facilitates selection of one of the gear ratios with the drill 22 when the drill attachment member 12 can engage the input shaft 48 by receiving a part of the input shaft 48 into the hole 28 of the drill attachment member 12 or by receiving the locking pin 74 into the hole 28. In such an arrangement, the drill 22 can be moved away from the input shaft 48 to pull the input shaft 48 axially in a first direction and the drill 22 can be moved toward the input shaft 48 to push the input shaft 48 in a second direction opposite the first direction.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A connector system for operationally coupling a drill to a trailer-mounted mechanism, the system comprising:

a drill attachment member being elongated from a drill end to an output end of the drill attachment member, the drill attachment member being configured for being clamped by a chuck of the drill adjacent to the drill end, the drill attachment member having a notch extending into the output end and extending transversely through the drill attachment member;

an input shaft being engageable by the drill attachment member such that the input shaft is rotatable by the drill attachment member around a central axis of the input shaft;

a locking pin being insertable laterally through the input shaft, the locking pin being receivable into the notch, the locking pin including a retainer for retaining the locking pin on the input shaft; and a pin spacer being couplable to the input shaft and the locking pin, the pin spacer being shaped to retain a pair of segments of the locking pin opposite each other across the input shaft when the pin spacer is coupled to the input shaft and the locking pin.

2. The system of claim 1, wherein the drill attachment member comprises:

a drill portion including the drill end of the drill attachment member; and an output portion including the output end of the drill attachment member and being releasably couplable to the drill portion.

3. The system of claim 2, wherein the output portion has a recess extending into the output portion, the recess being complementary in shape to an opposing end of the drill portion with respect to the drill end.

4. The system of claim 3, wherein the recess has a square shape.

5. The system of claim 3, wherein the drill attachment member further comprises a securement member for securing the drill portion to the output portion, the securement member comprising a biased pin coupled to the drill portion and being biased to extend through a wall of the output portion when the drill portion is received into the recess.

6. The system of claim 1, wherein an outer surface of the drill attachment member adjacent to the drill end has a hexagonal shape.

7. The system of claim 1, wherein the drill attachment member having a hole extending transversely through the drill attachment member and being positioned adjacent to the output end, the hole being radially spaced from the notch, the locking pin being receivable into the hole of the drill attachment member.

8. The system of claim 1, wherein the pin spacer has a channel extending through the pin spacer, the input shaft being receivable into the channel, the pin spacer including a first portion having an interior surface which is complementary in size and shape to a perimeter surface of the input shaft, the pin spacer including a second portion having an inner surface spaced from the perimeter surface of the input shaft, the output end of the drill attachment member being insertable into the channel between the input shaft and the second portion of the pin spacer, the locking pin being insertable simultaneously through each of the pin spacer, the input shaft, and one of the notch and the hole of the drill attachment member, the retainer being engageable with an outer surface of the pin spacer to retain the locking pin to the pin spacer and maintain the pair of segments of the locking pin opposite each other across the input shaft.

9. A connector system for operationally coupling a drill to a trailer-mounted mechanism, the system comprising:

a drill attachment member being elongated from a drill end to an output end of the drill attachment member, an outer surface of the drill attachment member adjacent to the drill end having a hexagonal shape, the drill attachment member being configured for being clamped by a chuck of the drill adjacent to the drill end, the drill attachment member having a notch extending into the output end and extending transversely through the drill attachment member, the drill attachment member having a hole extending transversely through the drill attachment member and being positioned adjacent to the output end, the hole being radially spaced from the notch, the drill attachment member having a cavity extending into the output end, the cavity being in communication with the notch and the hole, the drill attachment member comprising:

a drill portion including the drill end of the drill attachment member;

an output portion including the output end of the drill attachment member and being releasably couplable to the drill portion, the output portion having a recess extending into the output portion, the recess being complementary in shape to an opposing end of the drill portion with respect to the drill end, the recess having a square shape; and a securement member for securing the drill portion to the output portion, the securement member comprising a biased pin coupled to the drill portion and being biased to extend through a wall of the output portion when the drill portion is received into the recess;

an input shaft being engageable by the drill attachment member such that the input shaft is rotatable by the drill attachment member around a central axis of the input shaft;

a locking pin being insertable laterally through the input shaft, the locking pin being receivable into a selected one of the notch and the hole of the drill attachment member, the locking pin including a retainer for retaining the locking pin on the input shaft; and a pin spacer being couplable to the input shaft and the locking pin, the pin spacer being shaped to retain a pair of segments of the locking pin opposite each other across the input shaft when the pin spacer is coupled to the input shaft and the locking pin, the pin spacer having a channel extending through the pin spacer, the input shaft being receivable into the channel, the pin spacer including a first portion having an interior surface which is complementary in size and shape to a perimeter surface of the input shaft, the pin spacer including a second portion having an inner surface spaced from the perimeter surface of the input shaft, the output end of the drill attachment member being insertable into the channel between the input shaft and the second portion of the pin spacer, the locking pin being insertable simultaneously through each of the pin spacer, the input shaft, and one of the notch and the hole of the drill attachment member, the retainer being engageable with an outer surface of the pin spacer to retain the locking pin to the pin spacer and maintain the pair of segments of the locking pin opposite each other across the input shaft.

* * * * *